US012623309B2

(12) United States Patent
Aas et al.

(10) Patent No.: US 12,623,309 B2
(45) Date of Patent: May 12, 2026

(54) COLLABORATIVE ROBOT WELDING SYSTEM

(71) Applicant: Lincoln Global, Inc., Santa Fe Springs, CA (US)

(72) Inventors: Jacob F. Aas, Windsor, CO (US); Emily A. Lickiss, Fort Collins, CO (US); Taylor L. Robertson, Kitchener (CA); Levi J. Mitchell, Windsor, CO (US); Camila Maria Perez Gavilan Torres, Kitchener (CA)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 653 days.

(21) Appl. No.: 18/128,618

(22) Filed: Mar. 30, 2023

(65) Prior Publication Data

US 2024/0326178 A1 Oct. 3, 2024

(51) Int. Cl.
B23K 37/02 (2006.01)
B23K 9/095 (2006.01)
(Continued)

(52) U.S. Cl.
CPC ........ B23K 37/0229 (2013.01); B23K 9/0953 (2013.01); B25J 9/0081 (2013.01); B25J 15/0019 (2013.01)

(58) Field of Classification Search
CPC .. B23K 9/0953; B23K 26/0884; G05B 19/42; B25J 9/1664
See application file for complete search history.

(56) References Cited

U.S. PATENT DOCUMENTS 5,571,431 A 11/1996 Lantieri et al.
6,522,949 B1 2/2003 Ikeda et al.
(Continued)

FOREIGN PATENT DOCUMENTS

DE 102019001207 A1 * 8/2019 ............ B25J 9/1682
EP 2546711 A2 1/2013
(Continued)

OTHER PUBLICATIONS

Extended European Search Report from Corresponding Application No. EP24167011.6; Dated Sep. 3, 2024; pp. 1-7.

*Primary Examiner* — Courtney D Heinle
*Assistant Examiner* — Ryan C Clark
(74) *Attorney, Agent, or Firm* — Brad C. Spencer

(57) ABSTRACT

A welding system includes a collaborative robot, a robot controller, a welding torch having an end located at a tool center point (TCP), a welding power supply, and a teach pendant. The teach pendant includes a UI application configured for programming welding points and parameters. In a first operation mode, the UI application displays the plurality of welding points in a list that includes a high-lighted closest welding point having a three-dimensional position that is closest to the TCP. The highlighted closest welding point automatically updates upon manual move-ment TCP. In a second operation mode, the list includes a highlighted selected welding point, and the UI further dis-plays a selector button that shows a straight line distance of the TCP to a three-dimensional position of the highlighted selected welding point. Activation of the selector button causes the TCP to move to the position of the highlighted selected welding point.

25 Claims, 11 Drawing Sheets

(51) Int. Cl.
   *B25J 9/00*       (2006.01)
   *B25J 15/00*      (2006.01)

(56) References Cited

U.S. PATENT DOCUMENTS

| | | | |
|---|---|---|---|
| 7,962,967 | B2 | 6/2011 | Becker et al. |
| 10,363,632 | B2 | 7/2019 | Hsu |
| 10,417,934 | B2 | 9/2019 | Becker |
| 10,672,294 | B2 | 6/2020 | Albrecht et al. |
| 10,766,089 | B2 * | 9/2020 | Fisher .................... B23K 9/186 |
| 11,007,594 | B2 | 5/2021 | Daniel et al. |
| 11,241,759 | B2 | 2/2022 | Takeda |
| 11,423,800 | B2 | 8/2022 | Batzler et al. |
| 11,517,973 | B2 | 12/2022 | Eissara |
| 11,554,439 | B2 | 1/2023 | Knoener et al. |
| 11,565,338 | B2 | 1/2023 | Ulrich et al. |
| 2005/0049749 | A1 | 3/2005 | Watanabe et al. |
| 2015/0122781 | A1 | 5/2015 | Albrecht |
| 2017/0235301 | A1 * | 8/2017 | Atohira .................. G05B 19/42 |
| | | | 700/254 |
| 2018/0130226 | A1 | 5/2018 | Meess et al. |
| 2021/0060792 | A1 * | 3/2021 | Yoshida ............... B23K 9/0956 |
| 2021/0101220 | A1 | 4/2021 | Dunahoo et al. |
| 2021/0260750 | A1 | 8/2021 | Beard, III et al. |
| 2021/0370442 | A1 | 12/2021 | Rührnößl et al. |
| 2022/0226922 | A1 * | 7/2022 | Albrecht .................. B23K 9/23 |
| 2022/0250183 | A1 * | 8/2022 | Knoener ................ B25J 19/023 |
| 2022/0297216 | A1 | 9/2022 | Vidakovic et al. |

FOREIGN PATENT DOCUMENTS

| | | | |
|---|---|---|---|
| JP | S58-155188 A | 9/1983 | |
| JP | S61-262809 A | 11/1986 | |
| WO | 84/02099 A1 | 6/1984 | |
| WO | WO-2017097377 A1 * | 6/2017 | ............. G05B 19/42 |

* cited by examiner

COLLABORATIVE ROBOT WELDING SYSTEM

BACKGROUND OF THE INVENTION

Field of the Invention

Embodiments of the present invention relate to the use of collaborative robots (cobots) for welding, additive manufacturing or plasma cutting. More specifically, embodiments of the present invention relate to a user interface for a cobot system, such as a teach pendant, and its user interface application software.

Description of Related Art

The motions of a cobot can be programmed using a teach pendant. The teach pendant may be hardwired to a robot controller for the cobot or may communicate wirelessly with the robot controller. The teach pendant may take the form of a tablet device having primarily a touch screen interface and having user interface application software that provides software buttons or selectors and other input and informational devices/fields for programming the cobot. The cobot manufacturer typically provides a proprietary user interface application for programming its cobot, but such an application may not be optimal for welding, additive manufacturing, cutting or similar metal fabrication operations. Thus, an improved user interface application for use in welding, additive manufacturing, cutting or similar metal fabrication operations would be desirable.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding system that includes a collaborative robot having a movable arm, a robot controller operatively connected to the collaborative robot, a welding torch attached to the movable arm of the collaborative robot and having a distal end located at a tool center point (TCP) known by the robot controller, a welding power supply operatively connected to the welding torch to supply welding current to the welding torch, and a teach pendant in communication with at least one of the robot controller and the welding power supply. The teach pendant includes a user interface application configured for programming both a plurality of welding points and a plurality of welding parameters of a welding operation performed by the collaborative robot. In a first operation mode, the user interface application displays the plurality of welding points in a list and the list includes a highlighted closest welding point, wherein the highlighted closest welding point has a three-dimensional position that is closest to the TCP relative to other welding points in the list, and wherein the highlighted closest welding point automatically updates upon manual movement of the movable arm of the collaborative robot and the TCP. In a second operation mode, the user interface application displays the plurality of welding points in the list and the list includes a highlighted selected welding point, and wherein the user interface application further displays a selector button that shows a straight line distance of the TCP to a three-dimensional position of the highlighted selected welding point. Activation of the selector button causes the moveable arm of the collaborative robot to move the TCP to the three-dimensional position of the highlighted selected welding point.

In accordance with another aspect of the present invention, provided is a welding system that includes a collaborative robot having a movable arm, a robot controller operatively connected to the collaborative robot, a welding torch attached to the movable arm of the collaborative robot and having a distal end located at a tool center point (TCP) known by the robot controller, a welding power supply operatively connected to the welding torch to supply welding current to the welding torch, and a teach pendant in communication with at least one of the robot controller and the welding power supply. The teach pendant includes a user interface application configured for programming both a plurality of welding points and a plurality of welding parameters of a welding operation performed by the collaborative robot. The user interface application is configured to receive respective user inputs of a welding wire material type, a welding wire size, a shielding gas composition, and a workpiece thickness, and, based on the welding wire material type, the welding wire size, the shielding gas composition, and the workpiece thickness, automatically determine the plurality of welding parameters. The user interface application is configured to display the plurality of welding points in a list and the list includes a highlighted selected welding point, and wherein the user interface application further displays a selector button that shows a straight line distance of the TCP to a three-dimensional position of the highlighted selected welding point. Activation of the selector button causes the moveable arm of the collaborative robot to move the TCP to the three-dimensional position of the highlighted selected welding point.

In accordance with another aspect of the present invention, provided is a welding system that includes a collaborative robot having a movable arm, a robot controller operatively connected to the collaborative robot, a welding torch attached to the movable arm of the collaborative robot and having a distal end located at a tool center point (TCP) known by the robot controller, a welding power supply operatively connected to the welding torch to supply welding current to the welding torch, and a teach pendant in communication with at least one of the robot controller and the welding power supply. The teach pendant includes a user interface application configured for programming both a plurality of welding points and a plurality of welding parameters of a welding operation performed by the collaborative robot. The user interface application is configured to receive respective user inputs of a welding wire material type, a welding wire size, a shielding gas composition, and a workpiece thickness, and, based on the welding wire material type, the welding wire size, the shielding gas composition, and the workpiece thickness, automatically determine the plurality of welding parameters. The user interface application displays the plurality of welding points in a list and the list includes a highlighted closest welding point, wherein the highlighted closest welding point has a three-dimensional position that is closest to the TCP relative to other welding points in the list, and wherein the highlighted closest welding point automatically updates upon manual movement of the movable arm of the collaborative robot and the TCP.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
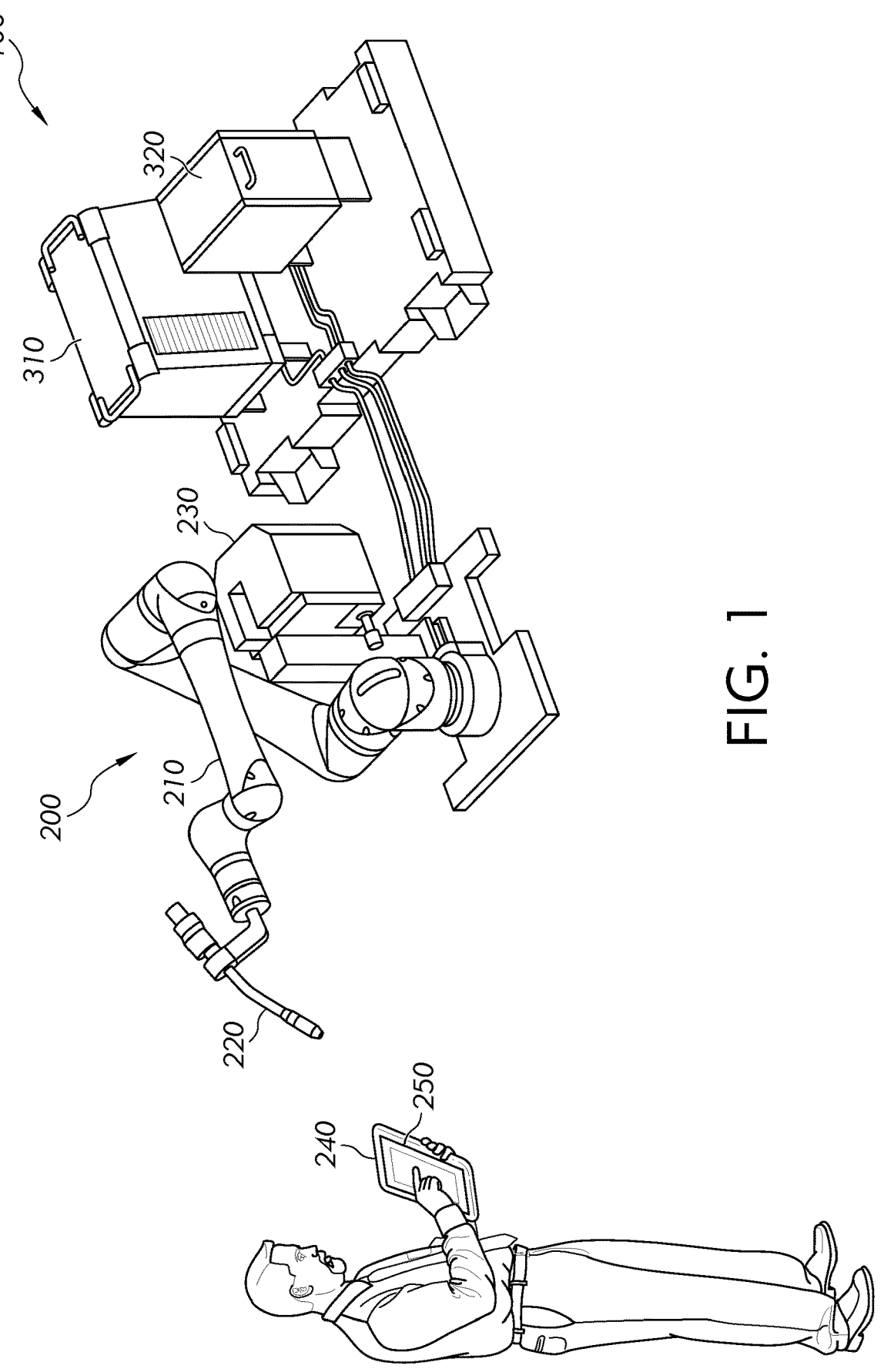
FIG. 1 shows a welding system having a collaborative robot.

The present invention relates to the use of collaborative robots (cobots) for welding, cutting, and similar operations and user interfaces for cobot systems. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a cobot welding system. Example welding processes include gas metal arc welding (GMAW), flux-cored arc welding (FCAW), metal-cored arc welding (MCAW), gas tungsten arc welding (GTAW), and the like. In addition to welding operations, embodiments of the present invention can be used in plasma cutting operations and welding-type processes, such as additive manufacturing and hardfacing processes. Thus, the term "welding" is to be interpreted to include such welding-type processes. Because such systems and processes are well known, they will not be described in detail herein.

Referring to FIG. 1, the welding system 100 includes a collaborative robot (cobot) 200 having a movable arm 210 (e.g., a 6-axis robot arm). The cobot allows for direct user interaction and contact with the cobot within a shared area. In this manner, the cobot and the user can work closely together and the user can manipulate or manually move the arm 210 of the cobot. The welding system 100 further includes a welding power supply 310 (e.g., an inverter-based power supply), supporting arc welding, and a robot controller 320. In accordance with another embodiment, the power supply may be a cutting power supply supporting plasma cutting. The robot controller 320 is operatively connected to the cobot 200 to program and control its movements. The robot controller 320 may be operatively connected to the cobot 200 via, for example, robot cables (e.g., control and communications cables).

A welding torch 220 is attached to the movable arm 210 of the cobot, e.g., at a "wrist" portion of the cobot. The terms "torch" and "gun" are used herein interchangeably. The welding power supply 310 is operatively connected to the welding torch 220 to supply welding current to the welding torch during a welding operation. The welding power supply 310 may be operatively connected to the welding torch 220 via a welding cable for example. The welding torch 220 has a distal end that generates the welding arc. The distal end of the welding torch 220 is located at a tool center point (TCP), which is known by the robot controller and/or a cobot teach pendant 240 via a calibration.

The cobot 200 can include a servo-mechanism apparatus 230 configured to move the arm 210 of the cobot under the command of the robot controller 320 via a motion program (e.g., to support movement over multiple degrees of freedom). The welding system 100 can include a wire feeder (not shown) to feed welding wire to the welding torch 220.

The welding system 100 further includes a teach pendant 240 for programming the cobot 200. The teach pendant 240 can be used to program welding points (e.g., weld start, end and intermediate points) for a welding operation to be performed by the cobot on a workpiece(s), as is known in the art. The teach pendant 240 is operatively coupled to the robot controller 320 for bidirectional communications therewith. The teach pendant 240 may also be operatively coupled to the welding power supply 310 for bidirectional communications with the power supply. The teach pendant 240 can be hardwired or tethered to the robot controller 320 and/or welding power supply 310 or can communicate wirelessly (e.g., via wi-fi, Bluetooth, etc.) In certain embodiments, the teach pendant 240 can be a tablet device having a touchscreen user interface 250. The teach pendant 240 can have user interface application software through which the user interacts with the welding system 100 to program welding operations, such as torch movements during welding and various welding parameters.

The user interface application can be hosted on the teach pendant 240 or elsewhere in the welding system (e.g., on the robot controller 320). In certain embodiments, the user interface application can be a web application. In addition to programming cobot arm 210 and torch 220 movements, the teach pendant 240 can be used to program welding parameters such as welding voltage or current, wire feed speed, trim setting, etc. The teach pendant 240 can also be used to program cobot arm 210 and torch 220 movements specific to a welding operation, such as welding weave frequency and weave width, dwell time, weave pattern, torch travel speed, torch angle (e.g., work angle and travel angle), etc.

Figure 2:
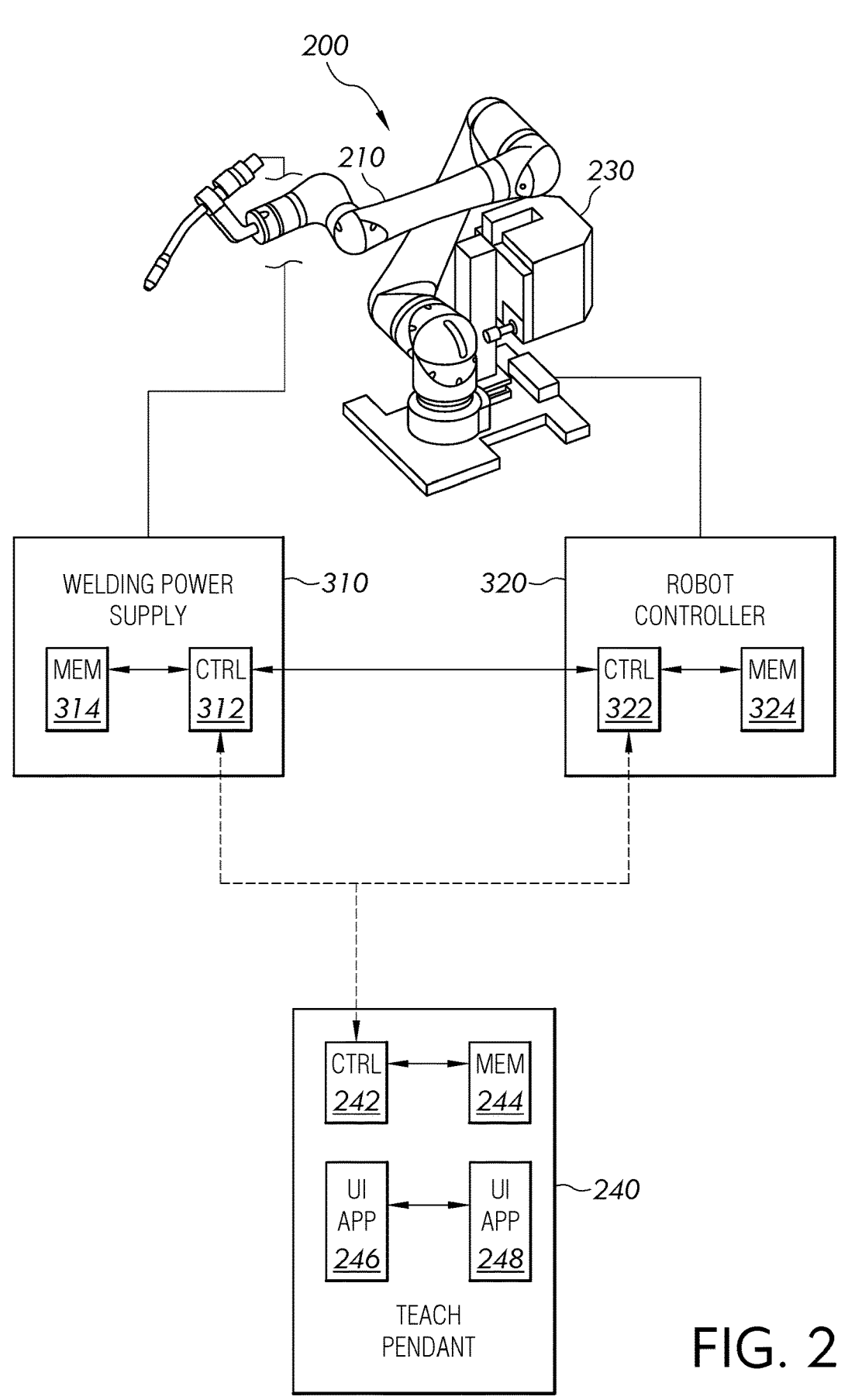
FIG. 2 is a block diagram of the welding system.

FIG. 2 is a schematic block diagram of the welding system 100. In addition to power electronic circuitry (e.g., PWM inverters, choppers, etc.), the welding power supply 310 can include a processor or controller 312 and memory 314. The memory 314 of the welding power supply 310 can store programmed instructions that, when executed by the processor 312, causes the power supply to perform the functionality ascribed to it herein. Similarly, the robot controller 320 and teach pendant 240 can include respective processors 322, 242 and memory 324, 244 for executing their functionality. Communications among the welding power supply 310, robot controller 320 and the teach pendant 240 are shown schematically in FIG. 2 via solid and dashed lines between the processors. The teach pendant 240 can include one or more user interface applications 246, 248. Cobot teach pendants typically include a user interface application 246 or programming software that is provided by the cobot manufacturer. However, the manufacturer-provided programming software is typically not tailored to welding operations. Thus, in an example embodiment, the teach pendant 240 can include a second user interface application 248 configured for programming both a plurality of welding points and a plurality of welding parameters of a welding operation performed by the cobot 200. The user interface applications 246, 248 can share information with each other and send data to and receive data from the robot controller 320 and/or the welding power supply 310. In an example embodiment, the second user interface application 248 can translate data into instructions or a computer language of the robot controller. In another example embodiment, the manufacturer-provided user interface application 246 can be excluded, and only the second user interface application 248 be employed in the welding system 100.

Example functionality of a user interface application 248 on the teach pendant 240 will now be described with reference to FIGS. 3-10. FIGS. 3-10 show various screen shots of the user interface application on the teach pendant 240.

Figure 3:
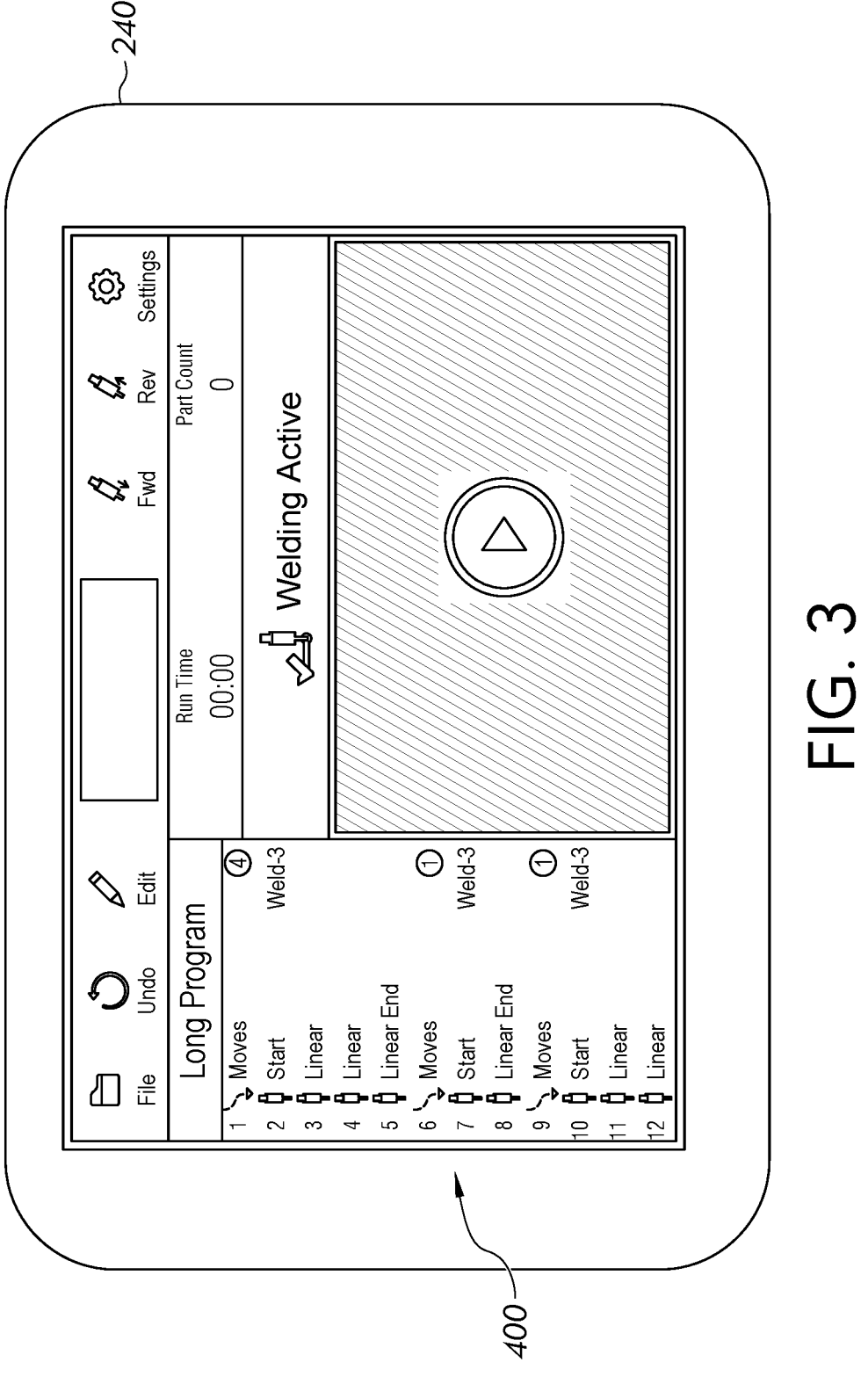
FIG. 3 is a screen shot of an example user interface application.
Figure 4:
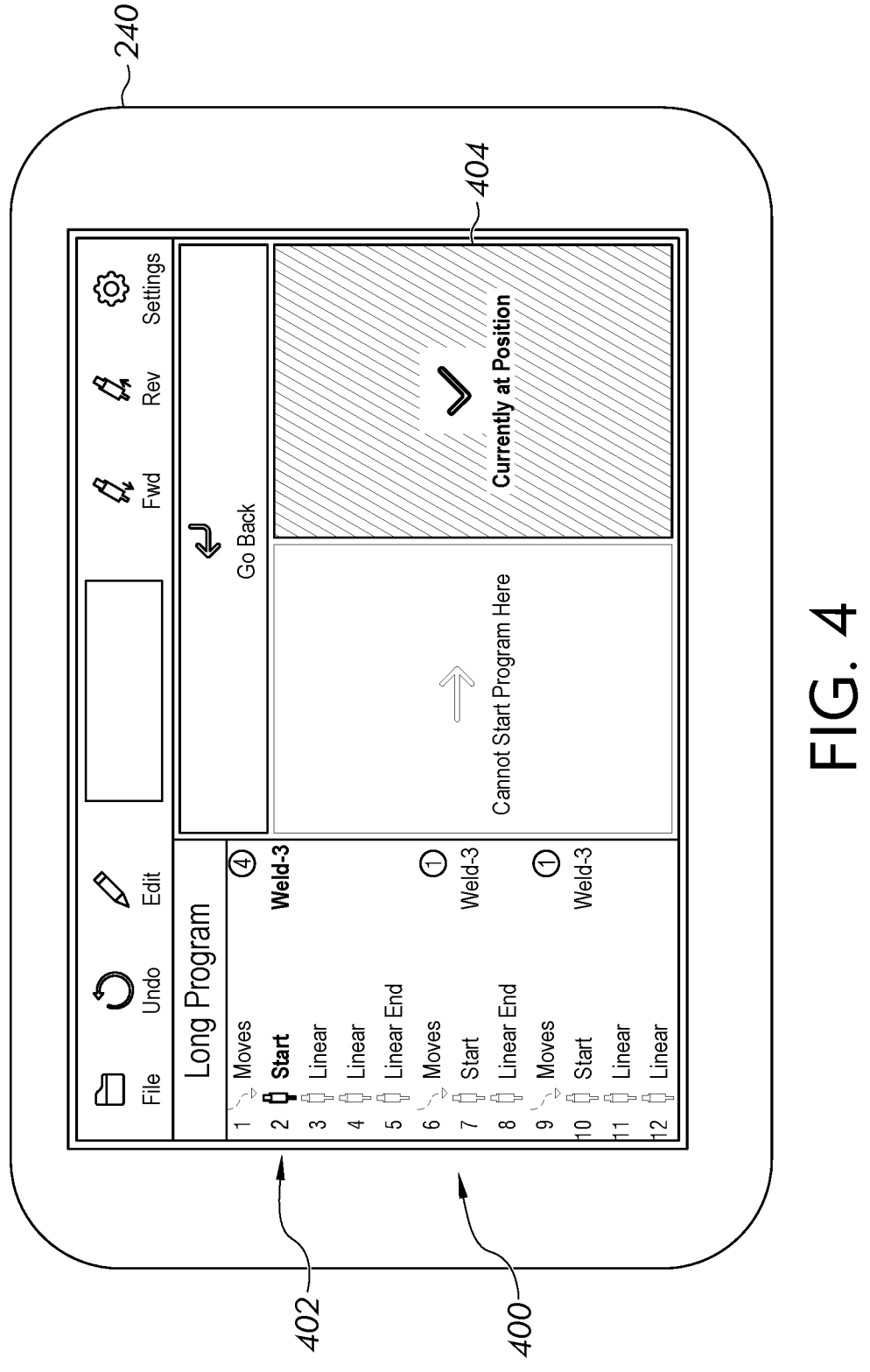
FIG. 4 is a screen shot of an example user interface application.
Figure 5:
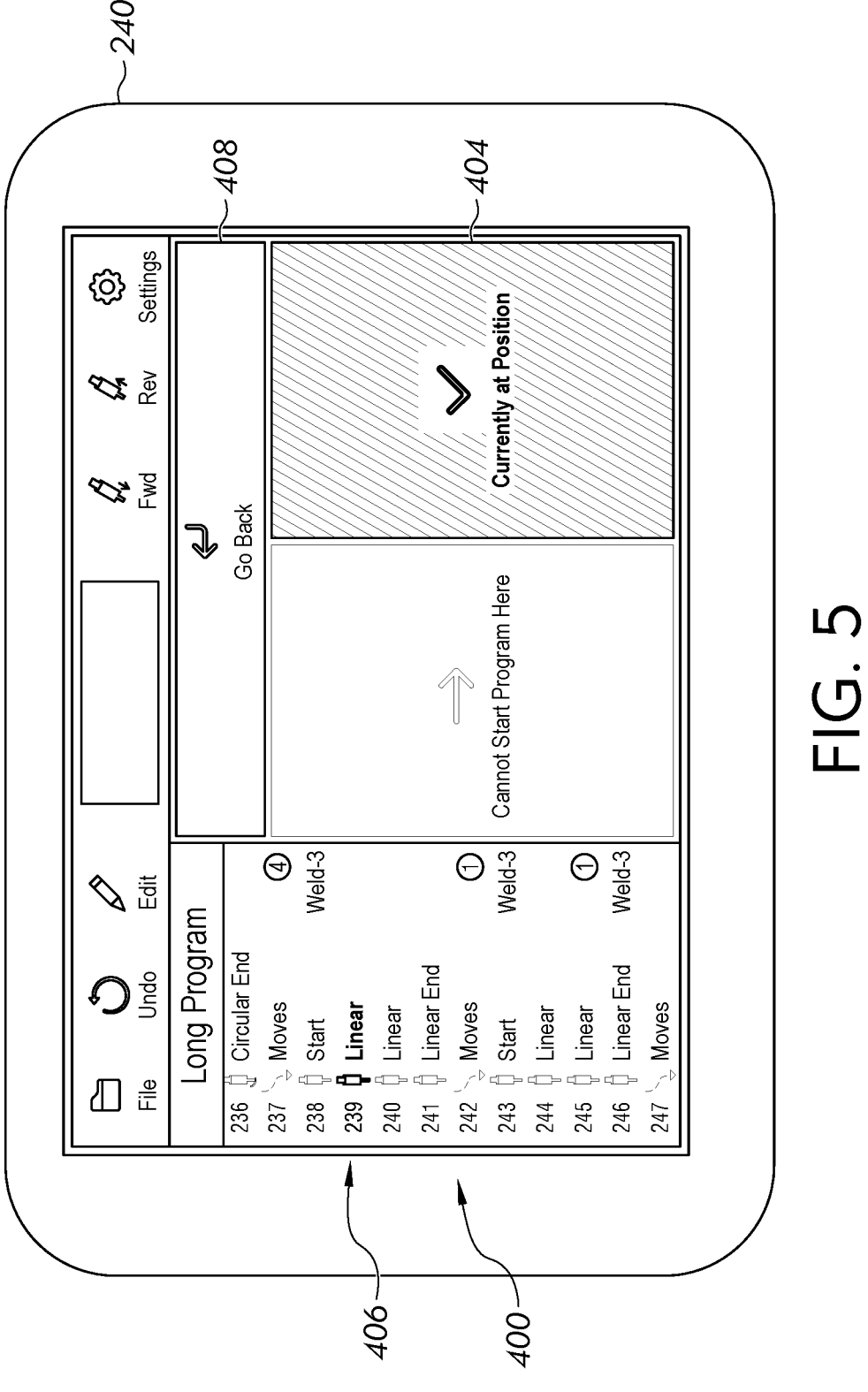
FIG. 5 is a screen shot of an example user interface application.

FIGS. 3-5 illustrate an auto scroll operation mode of the user interface application. A cobot welding operation can involve dozens or hundreds of programmed welding points. Editing the welding program, such as adding or removing welding points or modifying welding parameters, would typically require the operator to scroll through a long list of welding points until the desired point is found. An example user interface application displays a list 400 of a plurality of welding points of a welding operation. Only a portion of the list 400 of programmed welding points is displayed at any one time due to the length of the list. It can be seen that the list 400 can include individual weld start and end points, intermediate points along a weld or torch movements during a weld, and cobot arm movements between welds. If desired, a user can scroll upward or downward within the list 400 from point to point to select a desired welding point.

Alternatively, the user could use the auto scroll functionality discussed herein to more quickly select a desired welding point.

The auto scroll functionality uses the cobot arm and the tool center point (TCP) to auto scroll through the list 400 as the arm is manually moved by a user. The auto scroll functionality compares the calibrated TCP of the cobot, which is at the distal end of the welding torch and is known by the robot controller and/or the teach pendant, to the three-dimensional positions of the welding points in the list 400. As the cobot arm is moved, the location of the TCP in physical space is calculated continuously by the robot controller and/or the user interface application. The auto scroll functionality automatically highlights or selects the closest programmed welding point to the TCP's current position. The highlighted closest welding point has a three-dimensional position that is closest to the TCP relative to the other welding points in the list 400. The highlighted closest welding point automatically updates or changes as the cobot arm and the TCP are moved. Rather than manually scrolling up and down through the list 400 to find a desired welding point, the user can simply move the cobot arm so that the distal end of the torch is at the desired welding point (e.g., move the torch along a workpiece to be welded). The desired welding point will then be highlighted in the list 400 or otherwise automatically selected so that the user can view and/or edit various parameters associated with that point. FIG. 3 shows an initial user interface screen prior to a welding point being selected from the list 400. FIG. 4 shows "start" point 402 highlighted or selected in the list 400. Informational component 404 of the user interface provides visual confirmation that the torch and TCP are at the "start" point 402. The informational component 404 can include text, pictographic elements, color indications, etc. to convey to the user that the highlighted/selected point in the list 400 matches the current torch and TCP location in physical space. FIG. 5 shows an item 406 further down in the list 400 that was automatically highlighted or selected upon manual movement of the cobot arm. It can be seen between FIGS. 4 and 5 that the highlighted welding point jumped from the second entry in the list 400 to entry 239. Informational component 404 provides visual confirmation that the torch and TCP are currently at point 406 (entry 239 in the list). In addition to allowing individual welding points to be selected more quickly, the auto scroll feature also allows a user to select points in physical space (e.g., along a workpiece) without knowing the corresponding point in the list 400. For example, the user can move the distal end of the torch to a desired location on the workpiece and the corresponding welding point in the list 400 having the closest or matching three-dimensional position will be automatically selected for the user.

In certain embodiments, the user interface application can include a "go back" selector button 408 that, when pressed, deselects the highlighted closest welding point from the list 400 and reverts to the previously selected point. When the highlighted/selected point in the list 400 does not match the current TCP, the informational component 404 can provide an appropriate indication to the user, such as via a color change, textual information, pictographic elements, etc.

Figure 6:
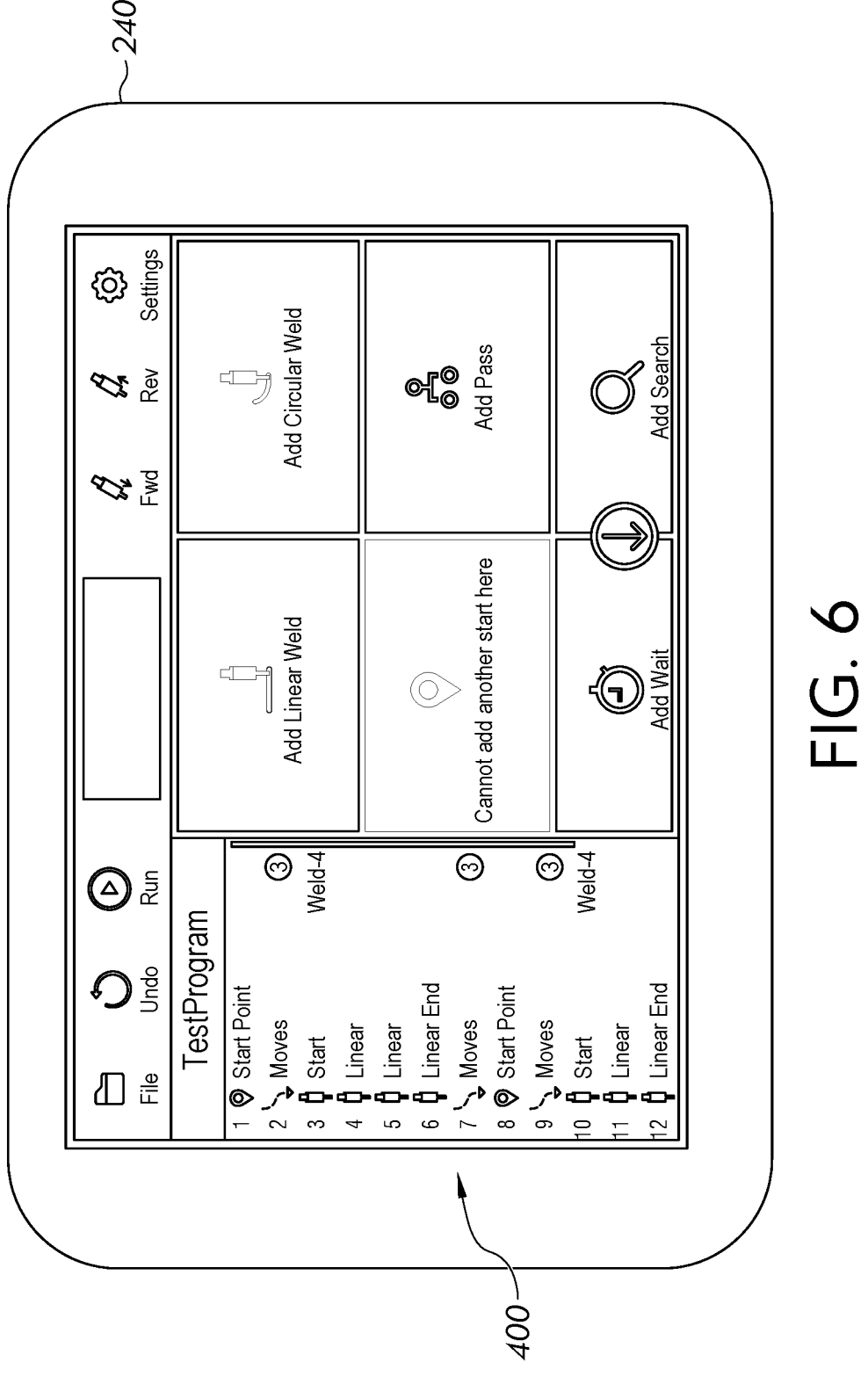
FIG. 6 is a screen shot of an example user interface application.
Figure 7:
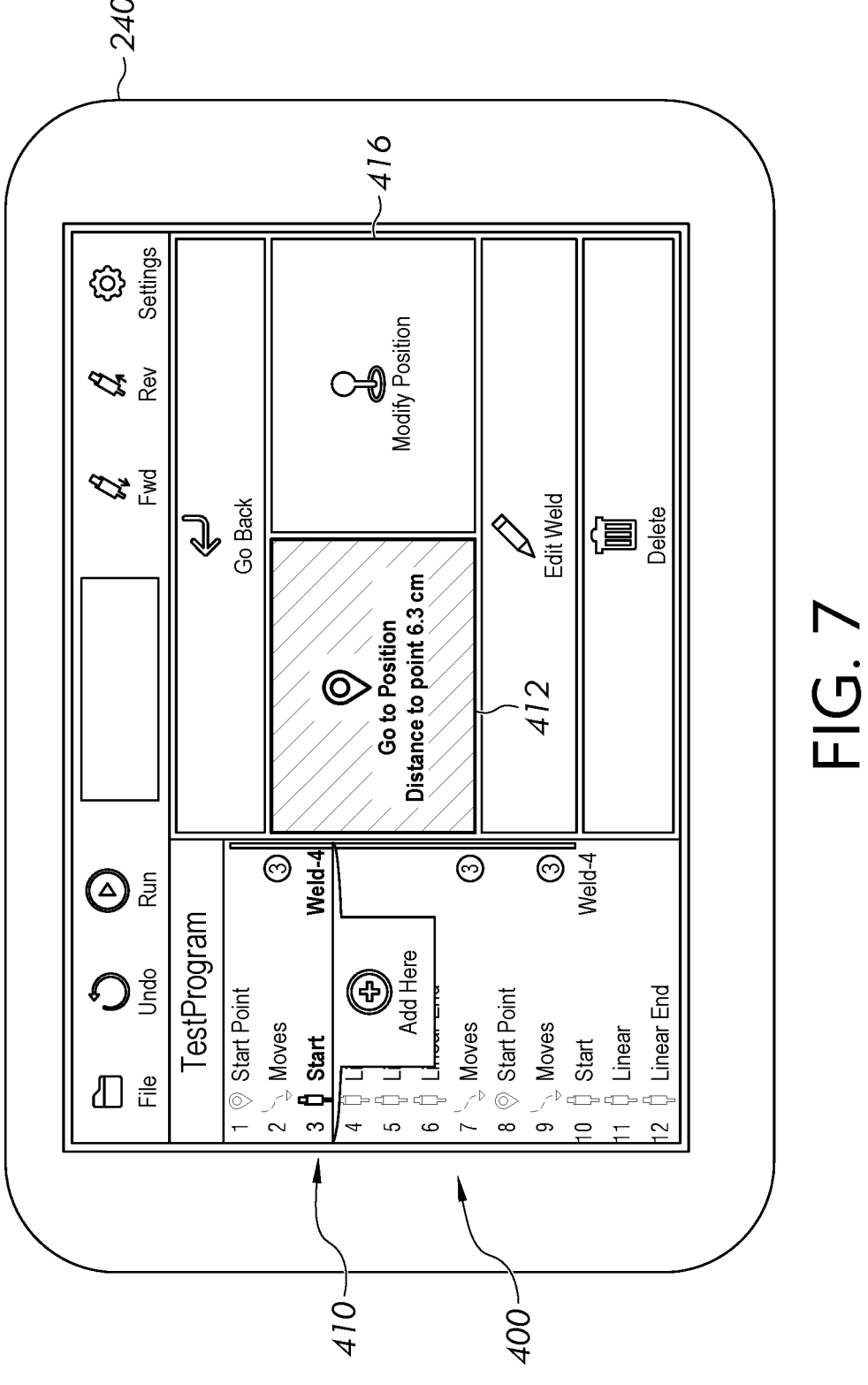
FIG. 7 is a screen shot of an example user interface application.
Figure 8:
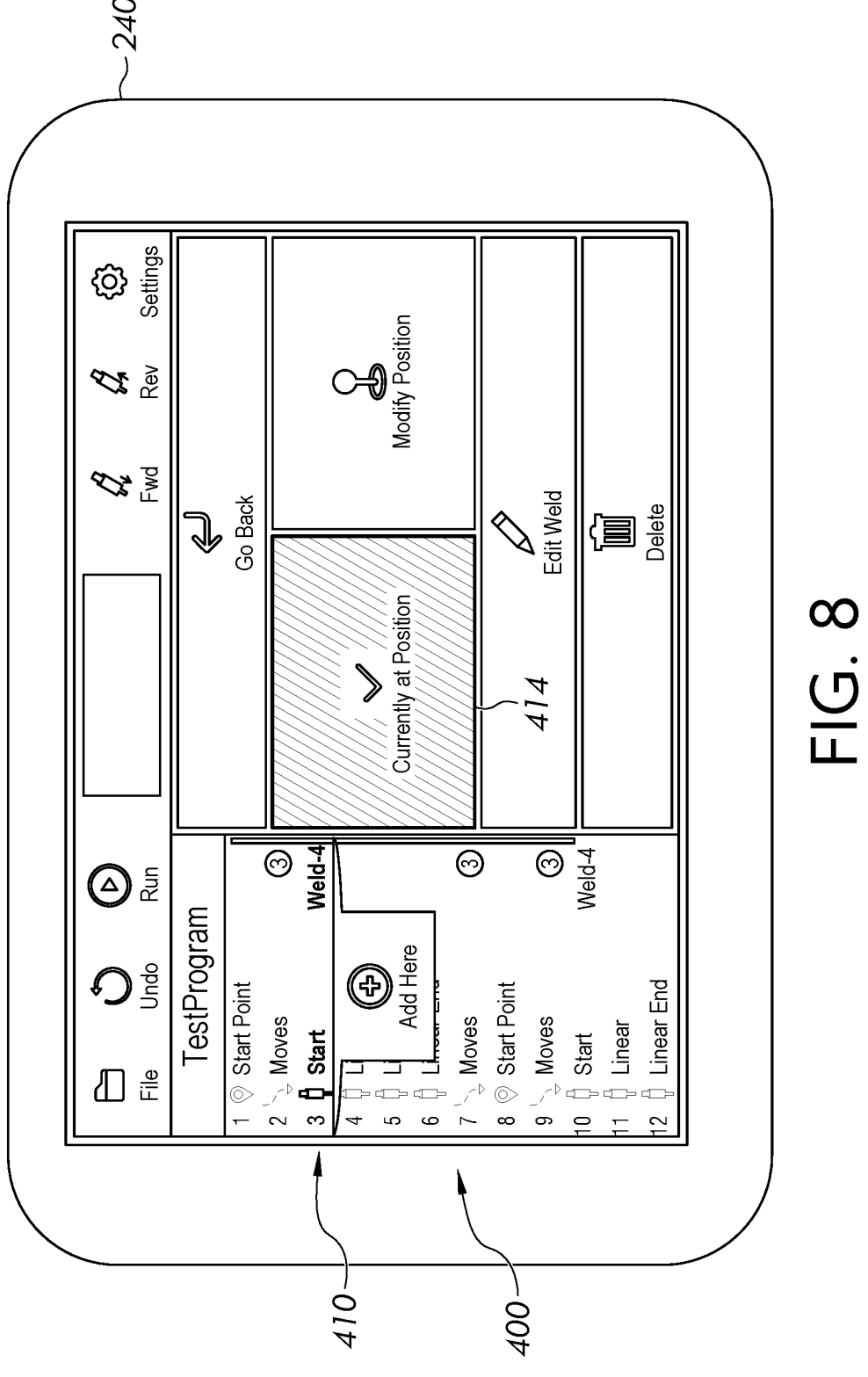
FIG. 8 is a screen shot of an example user interface application.

FIGS. 6-8 illustrate a further operation mode of the user interface application for controlling the cobot arm to move the TCP location in physical space to the three-dimensional position of the highlighted selected welding point in the list 400. This further operation mode also provides the user with easily understood feedback indicating whether or not the TCP is at the three-dimensional position of the highlighted selected welding point and, if not, how far away the TCP is from the selected point. FIG. 6 shows a landing screen of the user interface application prior to any point in the list 400 being selected. In FIG. 7, weld "start" point 410 is selected. However, the TCP is not at the three-dimensional position of start point 410. When the TCP is not currently at the three-dimensional position of the selected point 410, the user interface application displays a selector button 412 for moving the TCP to the selected point. In the embodiment of FIG. 7, the selector button 412 is labeled "go to position" to inform the user that activating the selector button will cause the cobot arm to move the TCP to the selected point. The selector button 412 provides visual confirmation to the user that the torch and TCP are not at the selected point 410. The selector button 412 can include text, pictographic elements, color indications, etc. to convey to the user that the high-lighted/selected point 410 in the list 400 does not match the current torch and TCP location in physical space. In an example embodiment, the user interface application calcu-lates the straight line distance between the current TCP and the three-dimensional position of selected point 410 and displays the distance on or near the selector button 412. In FIG. 7, the calculated distance is displayed on the selector button and is 6.3 cm. Activation of the selector button 412 causes the moveable arm of the cobot to move the TCP to the three-dimensional position of the selected point 410. The selector button 412 a can be click and release style button or a press and hold style button in which the cobot arm moves while the button is being pressed. The straight line distance between the TCP and the three-dimensional position of selected point 410 that is shown on the selector button 412 can be updated in real time as the cobot arm moves the TCP to the location of the selected point 410, to provide visual feedback to the user that the cobot arm is moving.

With reference to FIG. 8, once the TCP reaches the three-dimensional position of the selected point 410, the selector button changes to or is replaced by an informational component 414 to provide the user with visual confirmation that the torch and TCP are currently at the selected point 410. The informational component 414 can include text, picto-graphic elements, color indications, etc. to convey to the user that the highlighted/selected point 410 in the list 400 matches the current torch and TCP location in physical space. In an embodiment, the informational component 414 is a different color (e.g., green) from the selector button 412 (e.g., blue) to provide the user with easily understood feedback indicating that the TCP is now at the three-dimensional position of the selected point 410. For example, the color of the selector button changes from blue to green when the TCP reaches the three-dimensional position of the highlighted selected welding point.

With the TCP at the three-dimensional position of the selected point 410, the cobot arm can be manually moved to shift the TCP away from the selected point. When this occurs, the informational component 414 will be replaced with the selector button 412 shown in FIG. 7 and the straight-line distance between the current TCP and the selected point 410 will be displayed. The user interface application can include a "modify position" selector button 416 for reprogramming the three-dimensional position of the highlighted selected welding point 410 to the current TCP. Pressing the modify position selector button 416 will change the stored three-dimensional position of the selected point 410 to the current position of the TCP in physical space. When the three-dimensional position of the selected point 410 is reprogrammed to the current TCP, the three-dimen-sional position of the selected point and the location of the TCP will again match, and the selector button 412 will be replaced by the informational component 414 shown in FIG. 8. This serves as a positive immediate confirmation to the user that the selected point 410 has indeed been successfully reprogrammed. Previous cobot system have lacked or pro-vided inadequate feedback to the user that points have been successfully reprogrammed, and required the user to exam-ine a database of X, Y, Z points to confirm that programmed coordinates have been changed.

With the TCP at the three-dimensional position of the selected point 410 and the informational component 414 displayed, a different point could be selected from the list 400. When this occurs, the TCP, despite not having been physically moved, will no longer be at the location of the selected point because the selected point has changed. Accordingly, the informational component 414 will be replaced with the selector button 412 shown in FIG. 7 and the straight-line distance between the TCP and the newly-selected point 410 will be displayed. Activating the selector button 412 as discussed above will cause the cobot arm to move the TCP to the position of the newly-selected point.

A user can switch between the auto scroll operation mode of the user interface application and the operation mode discussed above with respect to FIGS. 6-8. For example, the auto scroll mode could be used to quickly find and select a desired point in the list 400, and the operation mode of FIGS. 6-8 could be used to reprogram the points.

Figure 9:
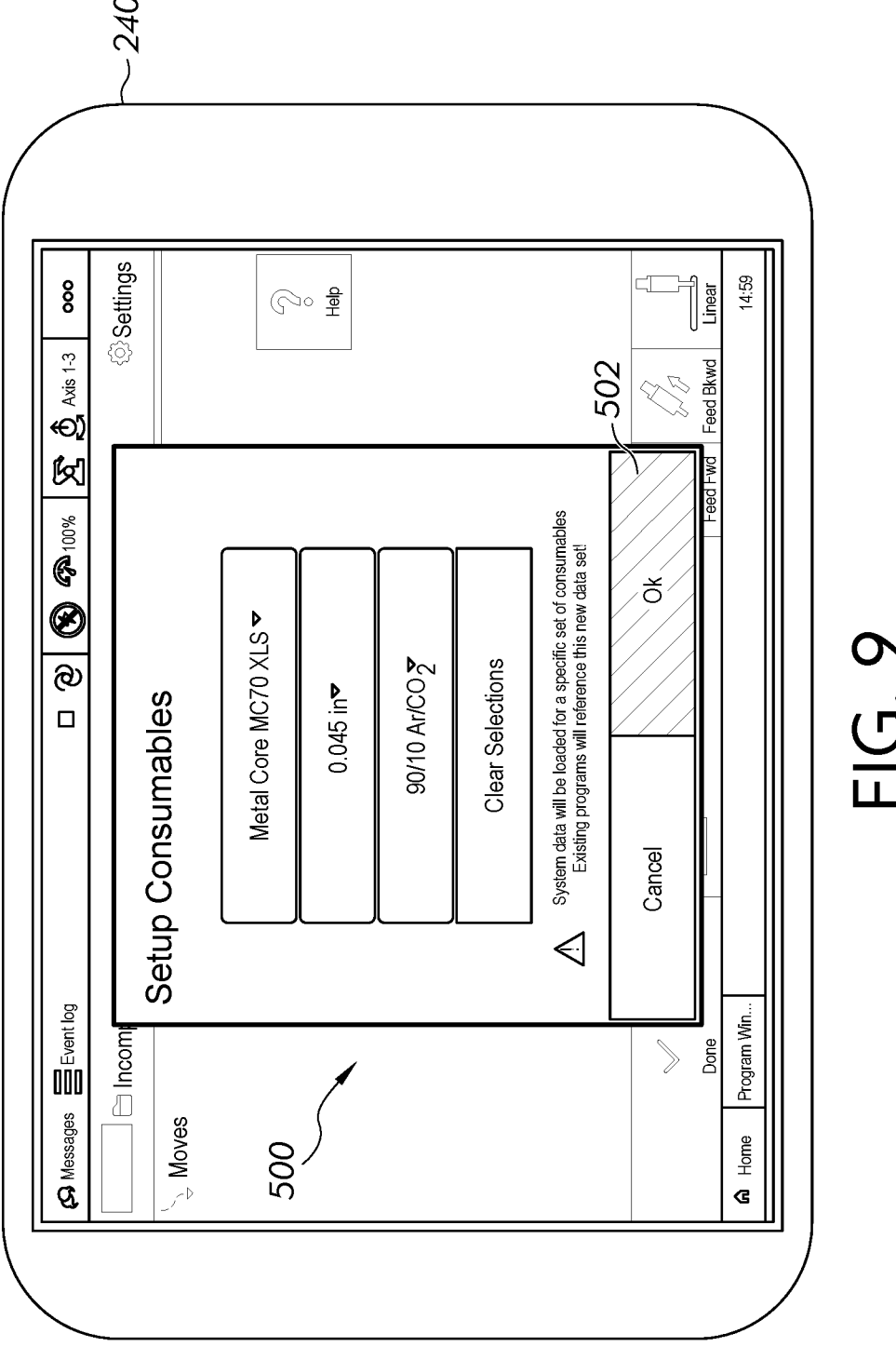
FIG. 9 is a screen shot of an example user interface application.
Figure 10:
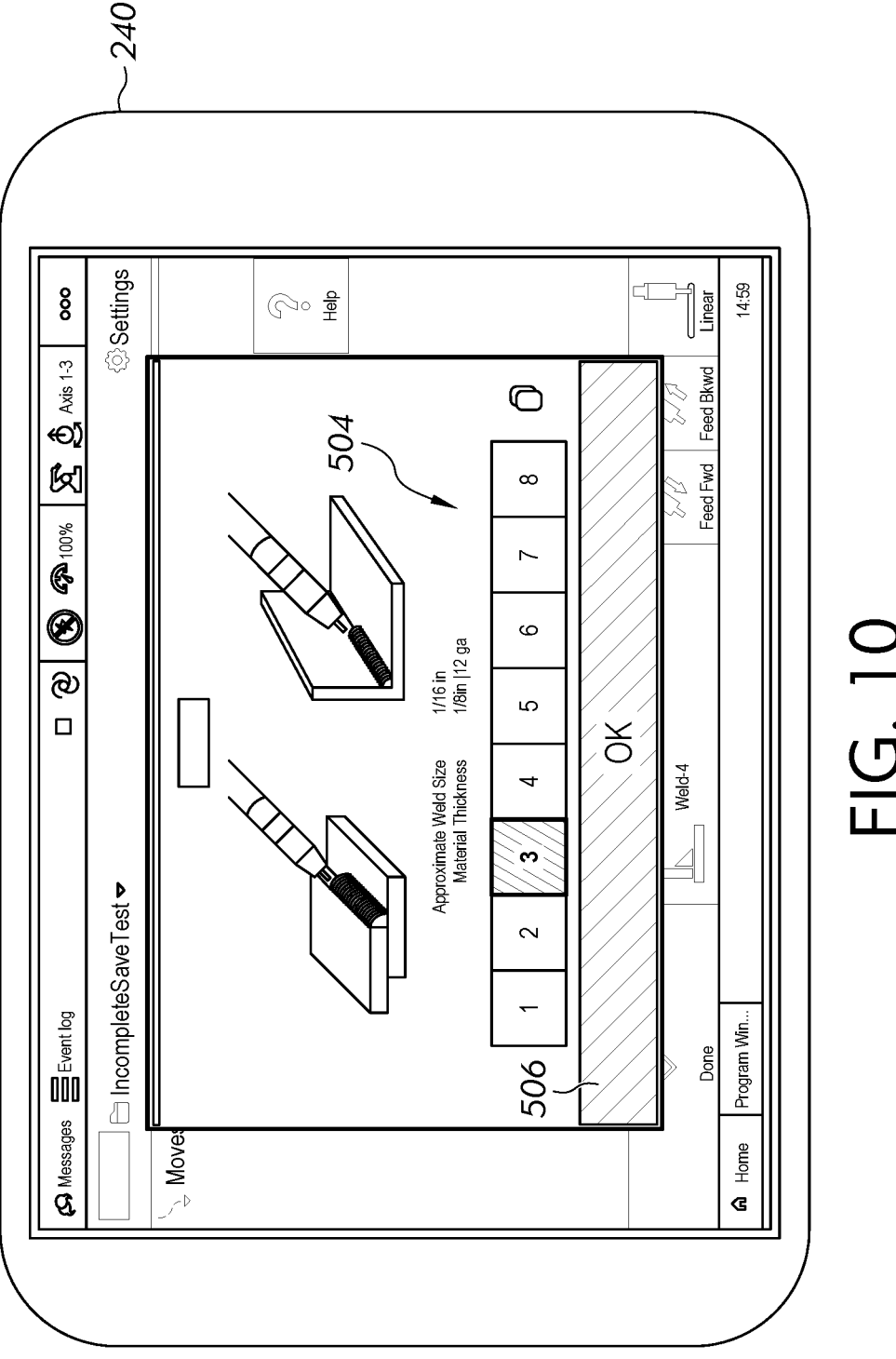
FIG. 10 is a screen shot of an example user interface application.

FIGS. 9 and 10 show example user interface application screens for programming cobot and welding parameters in a user-friendly, intuitive manner. FIG. 9 shows a consumable entry window that can be called up by pressing, for example, a settings button on the user interface. The user interface application receives user inputs of various consumable information 500 in via the consumable entry window. Example consumable information entered by the user includes welding wire material type (e.g., solid, flux-cored or metal-cored), welding wire size, and shielding gas com-position. In FIG. 9, the consumable entry window includes an "Ok" selector button 502 for recording the consumable entries. Activating the "Ok" selector button 502 brings up another selector window, shown in FIG. 10, for entering the material thickness of the welding workpiece. The material thickness could be entered in various ways, such as through a text field, dropdown list, etc. However, in the example embodiment of FIG. 10, material thickness is selected by operating a radio button 504 or one of a plurality of selector buttons. Each entry in the radio button 504 corresponds to a different material thickness, which is displayed in the win-dow when the entry is selected. In the example embodiment of FIG. 10, the radio button 504 provides eight different material thicknesses for selection by the user; however, the radio button could provide more than or fewer than eight different selections. In certain embodiments, a default initial selection can be made automatically by the user interface application, such as entry 4 for example, which the user is free to change. The default initial selection could be based on a common workpiece thickness or the last workpiece thickness entered. The material thickness entry window includes an "Ok" selector button 506 for recording the material thickness entry. It is to be expected that the material thickness of the workpiece(s) to be welded will change more frequently than the consumable setup entered via the con-sumable entry window (FIG. 9). In certain embodiments, the consumable entry window can be skipped when only the material thickness requires adjustment or confirmation.

Based on the entered welding wire material type, welding wire size, shielding gas composition, and workpiece thickness, the welding system automatically determines a plurality of welding parameters, such as welding voltage and current, wire feed speed, trim setting, etc., for the welding operation. In example embodiments, the welding system can also automatically program certain torch movements based on the consumable and workpiece thickness information, such as a torch weave frequency and weave width, dwell time, weave pattern, torch travel speed, torch angle (e.g., work angle and travel angle), etc. The welding system can include a stored database of welding parameters and torch movements that are associated with the welding wire material type, welding wire size, shielding gas composition, and workpiece thickness. For example, the database can be stored in the robot controller, welding power supply or the teach pendant if the teach pendant has sufficient memory. In certain embodiments, the welding parameters for a given workpiece material thickness are selected to maintain a relatively consistent weld bead size across different combinations of consumables. As the consumable entries are modified, the welding parameters will be adjusted accordingly to maintain a consistent weld bead size for the material thickness. Optimized welding parameter settings stored in the database can be determined empirically or experimentally. The automatically selected welding parameters and/or torch movements can be adjusted if desired and stored as a new welding configuration or setup.

Figure 11:
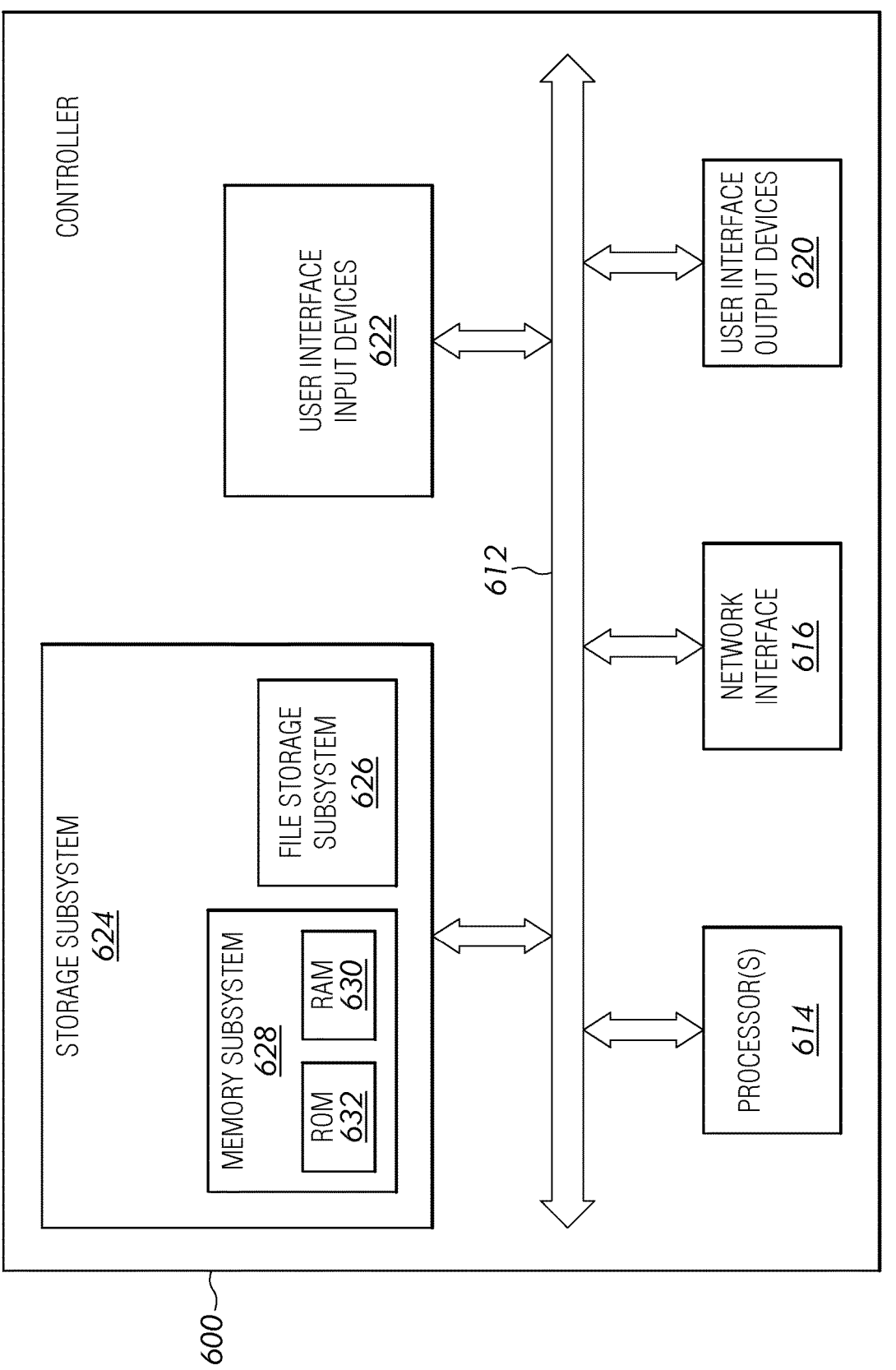
FIG. 11 illustrates a block diagram of an example embodiment of a controller that can be used, for example, in the welding system of FIGS. 1 and 2.

FIG. 11 illustrates a block diagram of an example embodiment of a controller 600 that can be used, for example, in the welding system 100 of FIG. 1. For example, the controller 600 may be used in the robot controller 320 and/or as a controller in the welding power supply 310. Referring to FIG. 6, the controller 600 includes at least one processor 614 (e.g., a microprocessor, a central processing unit, a graphics processing unit) which communicates with a number of peripheral devices via bus subsystem 612. These peripheral devices may include a storage subsystem 624, including, for example, a memory subsystem 628 and a file storage subsystem 626, user interface input devices 622, user interface output devices 620, and a network interface subsystem 616. The input and output devices allow user interaction with the controller 600. Network interface subsystem 616 provides an interface to outside networks and is coupled to corresponding interface devices in other devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 600 or onto a communication network.

User interface output devices 620 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 600 to the user or to another machine or computer system.

Storage subsystem 624 stores programming and data constructs that provide some or all of the functionality described herein. For example, computer-executable instructions and data are generally executed by processor 614 alone or in combination with other processors. Memory 628 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 626 in the storage subsystem 624, or in other machines accessible by the processor(s) 614.

Bus subsystem 612 provides a mechanism for letting the various components and subsystems of the controller 600 communicate with each other as intended. Although bus subsystem 612 is shown schematically as a single bus, alternative embodiments of the bus subsystem may use multiple buses.

The controller 600 can be of varying types. Due to the ever-changing nature of computing devices and networks, the description of the controller 600 depicted in FIG. 6 is intended only as a specific example for purposes of illustrating some embodiments. Many other configurations of a controller are possible, having more or fewer components than the controller 600 depicted in FIG. 6.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding system, comprising:
a collaborative robot having a movable arm;
a robot controller operatively connected to the collaborative robot;
a welding torch attached to the movable arm of the collaborative robot and having a distal end located at a tool center point (TCP) known by the robot controller;
a welding power supply operatively connected to the welding torch to supply welding current to the welding torch; and
a teach pendant in communication with at least one of the robot controller and the welding power supply, wherein the teach pendant includes a user interface application configured for programming both a plurality of welding points and a plurality of welding parameters of a welding operation performed by the collaborative robot,
wherein, in a first operation mode, the user interface application displays the plurality of welding points in a list and the list includes a highlighted closest welding point, wherein the highlighted closest welding point has a three-dimensional position that is closest to the TCP relative to other welding points in the list, and wherein the highlighted closest welding point automatically updates upon manual movement of the movable arm of the collaborative robot and the TCP, and
wherein, in a second operation mode, the user interface application displays the plurality of welding points in the list and the list includes a highlighted selected welding point, and wherein the user interface application further displays a selector button and a straight line distance of the TCP to a three-dimensional position of the highlighted selected welding point, wherein activation of the selector button causes the moveable arm of the collaborative robot to move the TCP to the three-dimensional position of the highlighted selected welding point.

2. The welding system of claim 1, wherein in said second operation mode, manual movement of the TCP away from the three-dimensional position of the highlighted selected welding point results in the selector button showing the straight line distance of the TCP to the three-dimensional position of the highlighted selected welding point.

3. The welding system of claim 2, wherein in said second operation mode, the user interface application further displays an additional selector button for reprogramming the three-dimensional position of the highlighted selected welding point to a current TCP.

4. The welding system of claim 1, wherein in said second operation mode, the straight line distance is updated in real time as the moveable arm of the collaborative robot moves the TCP to the three-dimensional position of the highlighted selected welding point.

5. The welding system of claim 1, wherein in said second operation mode, the selector button is replaced by an informational component having a different color than the selector button when the TCP reaches the three-dimensional position of the highlighted selected welding point.

6. The welding system of claim 1, wherein in said second operation mode, a color of the selector button changes when the TCP reaches the three-dimensional position of the highlighted selected welding point.

7. The welding system of claim 6, wherein in said second operation mode, selection of another welding point of the plurality of welding points in the list and having a three-dimensional position different from the TCP results in the selector button showing the straight line distance of the TCP to the three-dimensional position of said another welding point.

8. The welding system of claim 1, wherein the user interface application is configured to receive respective user inputs of a welding wire material type, a welding wire size, a shielding gas composition, and a workpiece thickness, and, based on the welding wire material type, the welding wire size, the shielding gas composition, and the workpiece thickness, automatically determine the plurality of welding parameters.

9. The welding system of claim 8, wherein at least one of the robot controller and the welding power supply stores a database of welding parameters associated with the welding wire material type, the welding wire size, the shielding gas composition, and the workpiece thickness.

10. The welding system of claim 8, wherein the user interface application is further configured to display a plurality of workpiece thickness selector buttons, each associated with a different workpiece thickness dimension, for receiving the user input of the workpiece thickness.

11. The welding system of claim 8, wherein based on the welding wire material type, the welding wire size, the shielding gas composition, and the workpiece thickness, the user interface application automatically determines a welding torch travel speed and a welding torch weave frequency.

12. A welding system, comprising:

a collaborative robot having a movable arm;

a robot controller operatively connected to the collaborative robot;

a welding torch attached to the movable arm of the collaborative robot and having a distal end located at a tool center point (TCP) known by the robot controller;

a welding power supply operatively connected to the welding torch to supply welding current to the welding torch; and a teach pendant in communication with at least one of the robot controller and the welding power supply, wherein the teach pendant includes a user interface application configured for programming both a plurality of welding points and a plurality of welding parameters of a welding operation performed by the collaborative robot, wherein the user interface application is configured to receive respective user inputs of a welding wire material type, a welding wire size, a shielding gas composition, and a workpiece thickness, and, based on the welding wire material type, the welding wire size, the shielding gas composition, and the workpiece thickness, automatically determine the plurality of welding parameters, and wherein the user interface application is configured to display the plurality of welding points in a list and the list includes a highlighted selected welding point, and wherein the user interface application further displays a selector button and a straight line distance of the TCP to a three-dimensional position of the highlighted selected welding point, wherein activation of the selector button causes the moveable arm of the collaborative robot to move the TCP to the three-dimensional position of the highlighted selected welding point.

13. The welding system of claim 12, wherein manual movement of the TCP away from the three-dimensional position of the highlighted selected welding point results in the selector button showing the straight line distance of the TCP to the three-dimensional position of the highlighted selected welding point.

14. The welding system of claim 13, wherein the user interface application further displays an additional selector button for reprogramming the three-dimensional position of the highlighted selected welding point to a current TCP.

15. The welding system of claim 12, wherein the straight line distance is updated in real time as the moveable arm of the collaborative robot moves the TCP to the three-dimensional position of the highlighted selected welding point.

16. The welding system of claim 12, wherein in said second operation mode, the selector button is replaced by an informational component having a different color than the selector button when the TCP reaches the three-dimensional position of the highlighted selected welding point.

17. The welding system of claim 12, wherein a color of the selector button changes when the TCP reaches the three-dimensional position of the highlighted selected welding point.

18. The welding system of claim 16, wherein selection of another welding point of the plurality of welding points in the list and having a three-dimensional position different from the TCP results in the selector button showing the straight line distance of the TCP to the three-dimensional position of said another welding point.

19. The welding system of claim 12, wherein at least one of the robot controller and the welding power supply stores a database of welding parameters associated with the welding wire material type, the welding wire size, the shielding gas composition, and the workpiece thickness.

20. The welding system of claim 12, wherein the user interface application is further configured to display a plurality of workpiece thickness selector buttons, each associated with a different workpiece thickness dimension, for receiving the user input of the workpiece thickness.

21. The welding system of claim 12, wherein based on the welding wire material type, the welding wire size, the shielding gas composition, and the workpiece thickness, the user interface application automatically determines a welding torch travel speed and a welding torch weave frequency.

22. A welding system, comprising:

a collaborative robot having a movable arm;

a robot controller operatively connected to the collaborative robot;

a welding torch attached to the movable arm of the collaborative robot and having a distal end located at a tool center point (TCP) known by the robot controller;

a welding power supply operatively connected to the welding torch to supply welding current to the welding torch; and a teach pendant in communication with at least one of the robot controller and the welding power supply, wherein the teach pendant includes a user interface application configured for programming both a plurality of welding points and a plurality of welding parameters of a welding operation performed by the collaborative robot, wherein the user interface application is configured to receive respective user inputs of a welding wire material type, a welding wire size, a shielding gas composition, and a workpiece thickness, and, based on the welding wire material type, the welding wire size, the shielding gas composition, and the workpiece thickness, automatically determine the plurality of welding parameters, and wherein the user interface application displays the plurality of welding points in a list and the list includes a highlighted closest welding point, wherein the highlighted closest welding point has a three-dimensional position that is closest to the TCP relative to other welding points in the list, and wherein the highlighted closest welding point automatically updates upon manual movement of the movable arm of the collaborative robot and the TCP.

23. The welding system of claim 22, wherein at least one of the robot controller and the welding power supply stores a database of welding parameters associated with the welding wire material type, the welding wire size, the shielding gas composition, and the workpiece thickness.

24. The welding system of claim 22, wherein the user interface application displays a plurality of workpiece thickness selector buttons, each associated with a different workpiece thickness dimension, for receiving the user input of the workpiece thickness.

25. The welding system of claim 22, wherein based on the welding wire material type, the welding wire size, the shielding gas composition, and the workpiece thickness, the user interface application automatically determines a welding torch travel speed and a welding torch weave frequency.

* * * * *